United States Patent [19]

Schweikle et al.

[11] 4,301,493
[45] Nov. 17, 1981

[54] INSULATOR MOUNTING FOR PANELBOARD

[75] Inventors: George E. Schweikle; Harris I. Stanback, both of Lexington, Ky.

[73] Assignee: Square D Company, Palatine, Ill.

[21] Appl. No.: 9,900

[22] Filed: Feb. 7, 1979

[51] Int. Cl.³ .............................................. H02B 1/04
[52] U.S. Cl. ..................................... 361/355; 361/361
[58] Field of Search .................. 200/304, 305, 144 R, 200/149 R, 149 B; 174/16 B, 16 HS, 129 B, 133 B; 361/346, 353, 355, 358, 361, 363, 376, 379; 335/201; 357/81

[56] References Cited

U.S. PATENT DOCUMENTS

| | | | |
|---|---|---|---|
| 4,038,585 | 7/1977 | Wolski | 361/355 |
| 4,045,751 | 8/1977 | Schressler | 200/144 R |
| 4,100,566 | 7/1978 | Okikawa | 357/81 |
| 4,142,225 | 2/1979 | Diersing | 361/361 |
| 4,151,547 | 4/1979 | Rhoades | 357/81 |

*Primary Examiner*—Gerald P. Tolin
*Attorney, Agent, or Firm*—Larry I. Golden; Norton Lesser; Richard T. Guttman

[57] ABSTRACT

The following specification describes a panelboard assembly comprising a plurality of modular insulators having spaced integrally formed resilient mounting rails for supporting a circuit breaker housing above the panelboard bus bars. Each circuit breaker is connected to a bar carrying current of one phase and on tripping may generate ionized arc gases that exit the arc chute passage and engage a bus bar carrying current of another phase. A thermoplastic insulating material is interposed in the path between the arc chute passage and a bus bar carrying current of another phase. A bend is also introduced in the bus bars intermediate their ends to force an insulating member interposed between the bus bars and a cabinet wall against the cabinet wall.

11 Claims, 14 Drawing Figures

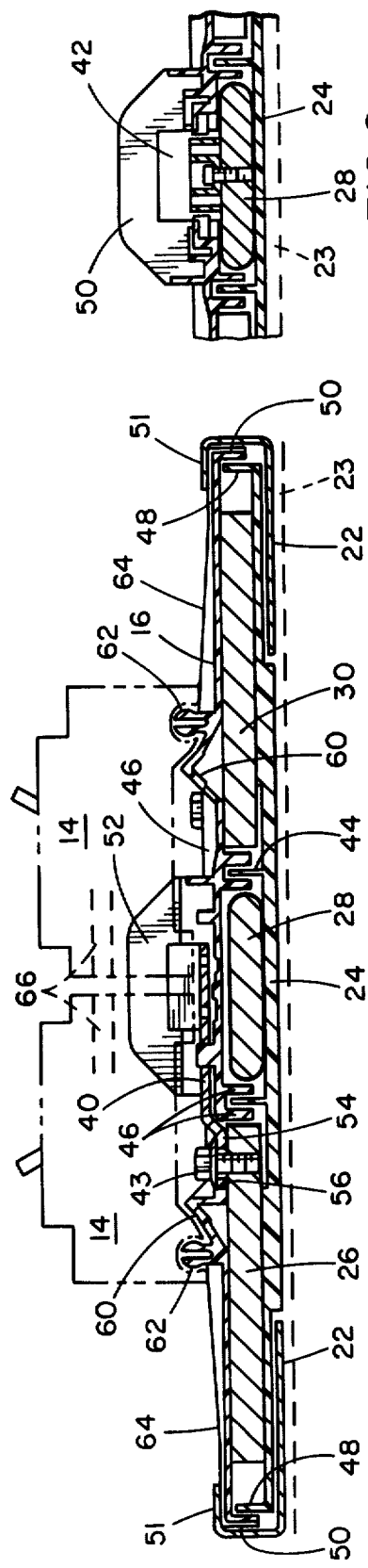
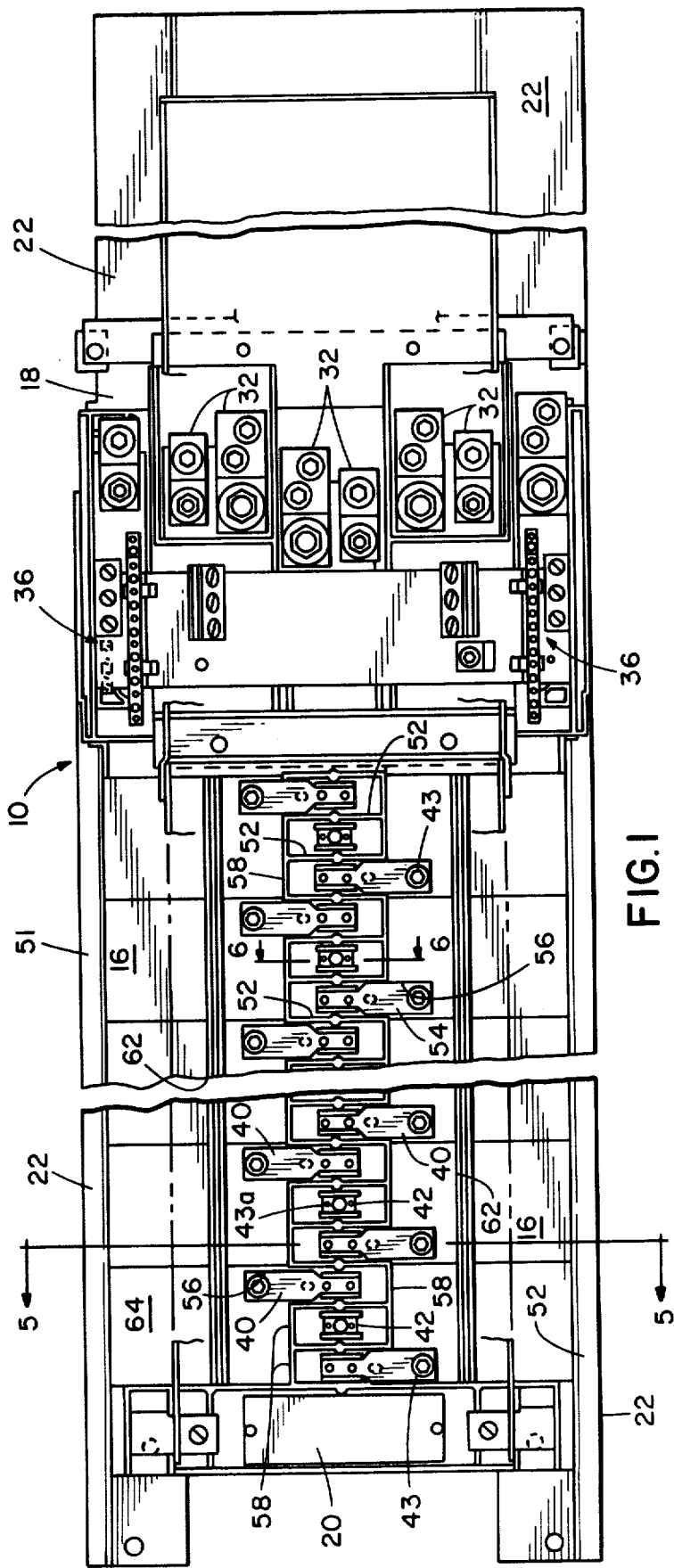

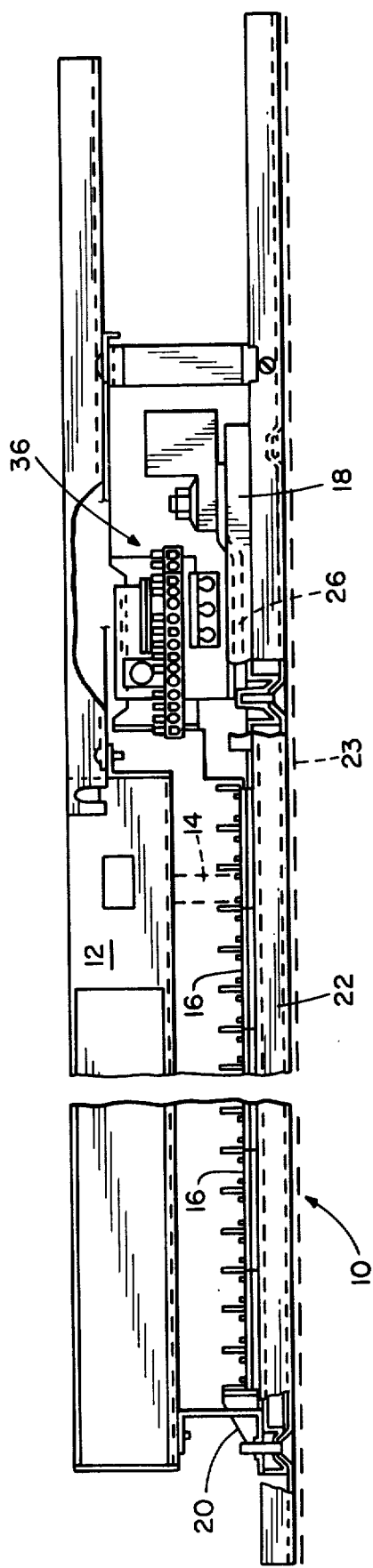
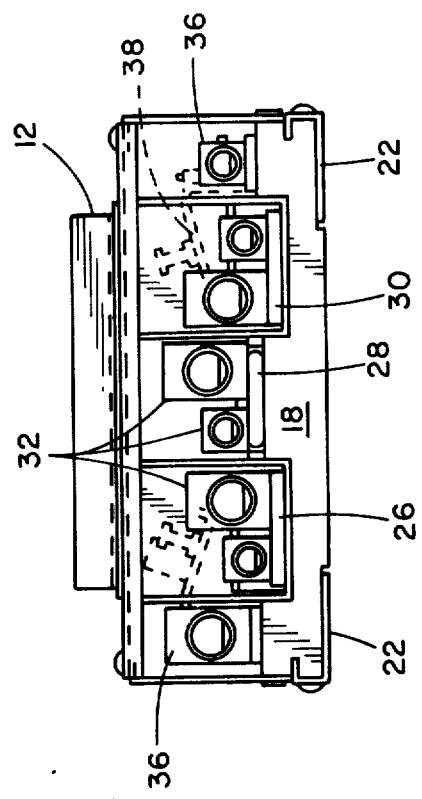
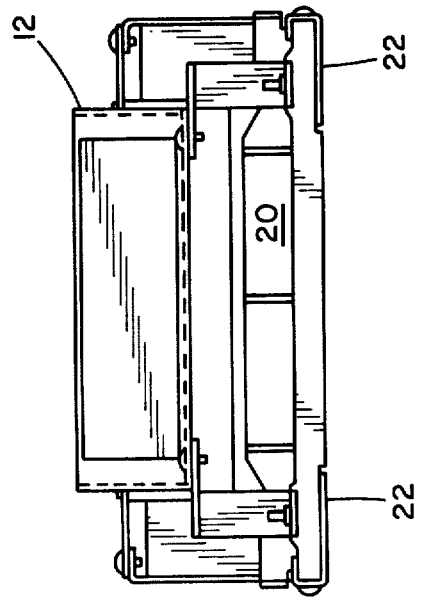

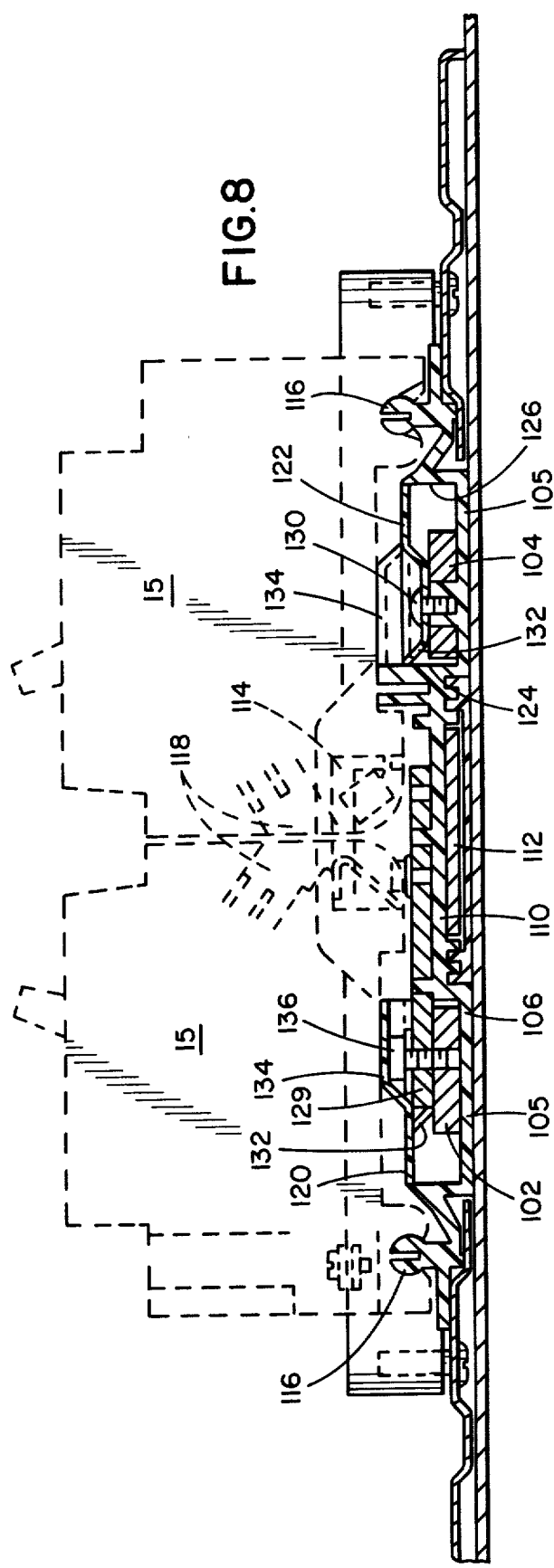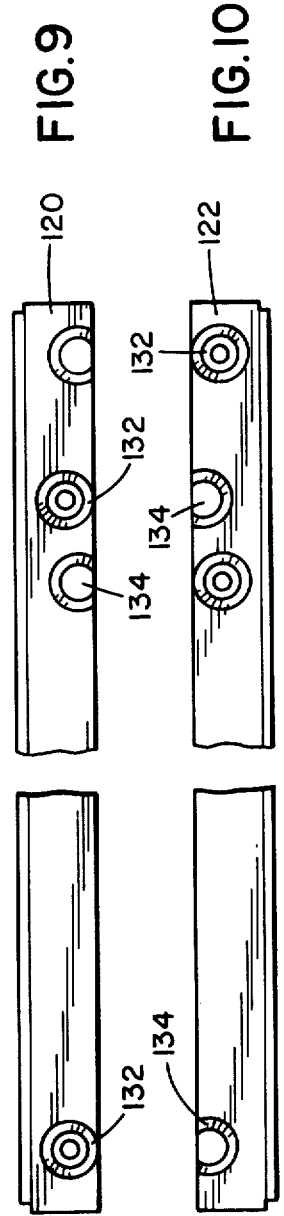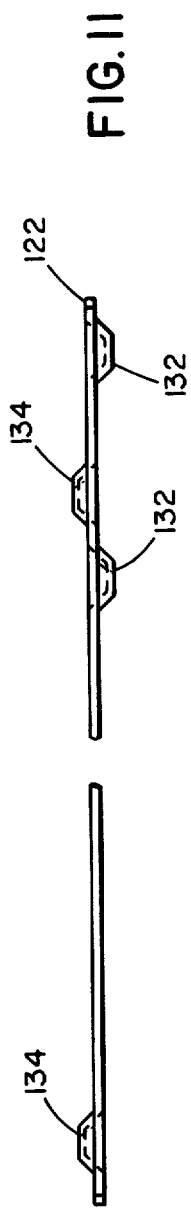

INSULATOR MOUNTING FOR PANELBOARD

BACKGROUND OF THE INVENTION

1. Field of the Invention

This invention relates in general to panelboard assemblies and more particularly to an improved and more economical panelboard assembly.

2. Summary of the Prior Art

In U.S. Pat. No. 4,142,225 which issued Feb. 27, 1979 and in related applications mentioned therein an improved panelboard assembly was shown. The panelboard assembly included a plurality of spaced bus bars supported on planar surfaces of a thermoplastic material in close heat transmitting relationship to the metal wall of a cabinet. The thermoplastic material included spaced resilient mounting rails or beads for securing circuit breakers extending over the bus bars from opposite margins of the assembly in end to end relationship to engage respective bus stabs located along the central longitudinal axis of the assembly and above a center bus bar.

A circuit breaker can thus extend from one rail toward a respective bus stab with the circuit breaker arc chute passage directed toward a bus bar of a different phase then the bus bar to which the respective stab is connected. If two breakers are connected in end to end relationship one of the breakers will block ionized gases exiting from the other breaker from contacting a bar of different phase. However if only one breaker is connected to the respective stab, gases exiting the arc chute passage may expand to contact a bus bar carrying current of another phase.

SUMMARY OF THE INVENTION

The present invention provides a panelboard assembly formed from a plurality of thermoplastic insulators or bases of modular design for use in high voltage high current electrical distribution systems. The modular bases are conveniently assembled to spaced parallel bus bars of selected length and bus stabs are connected to the bus bars for forming an interior assembly adapted to be conveniently mounted in an enclosure or cabinet. Adjacent bus stabs extend from either one of two spaced side bus bars toward the central axis above a center bus bar or bus stab is connected directly to the center bus bar.

Each bus stab in turn may connect to two terminals each on a respective circuit breaker. The breakers are positioned in end to end facing relationship with the arc chute passages in facing positions at the adjacent ends. The breakers are supported by spaced mounting rails or beads integrally formed on the bases or insulators adjacent the side bus bars. Thus a circuit breaker secured to one rail may connect to a bus stab with its arc chute passage directed to a bar of different phase. To prevent ionized gas exiting the circuit breaker arc chute passage from contacting a bus bar carrying current of a different phase, a web of insulating material is overlappingly engaged with each bus bar. A passage in the web at a position spaced inwardly from the mounting rails and in registry with a respective bus stab compartment enables a bus stab to be secured to the overlapped bus bar.

In another embodiment suitable for use with the arrangement shown in the aforementioned Diersing application separable thin webs or strips are provided between the circuit breakers and bus bars with the webs having offsets or embossments facilitating securing the webs to the bus bars and for accommodating the bolt heads securing the stabs to the bus bars.

In addition the bus bars utilized in the present invention are provided with a bow or bend intermediate their ends so that when the ends are securely clamped against a cabinet wall, the bow serves to press the insulator between the bars and wall firmly against the wall to insure good heat transmission.

Basically in a panelboard assembly including a plurality of spaced apart bus bars having spaced planar surfaces with each adapted to carry current of a different phase for transmission to a respective circuit breaker having an exit passage transmitting ionized gas in response to the tripping of said breaker there is provided a first insulating means in contiguous engagement with one planar surface of each bus bar, second insulating means spaced from said first insulating means for supporting a circuit breaker with said exit passage in facing relationship to a bus bar adapted to carry current of a phase different than the current transmitted to said circuit breaker and a third insulating means having a planar surface for overlapping engagement with another planar surface of each bar and overlapped by said circuit breaker with said third insulating member located between said circuit breaker exit passage and a bus bar carrying current of a different phase to prevent said ionized gas exiting said passage from engaging said bus bar carrying current of a different phase in response to the tripping of said circuit breaker.

It is therefore among the primary objects of the present invention to provide an improved panelboard assembly.

It is another object of the present invention to provide an improved assembly for preventing engagement between ionized gases exiting a circuit breaker and a panelboard metallic portion overlapped by a breaker.

Other objects and features of the present invention will become apparent on examination of the following specification and claims together with the drawings.

BRIEF DESCRIPTION OF THE DRAWINGS

FIG. 1 is a top elevational view of a panelboard assembly incorporating the principles of the present invention.

FIG. 2 is a side elevational view of the panelboard assembly shown in FIG. 1 partially broken away with an interior trim assembly attached.

FIG. 3 is an end elevational view of the panelboard assembly shown in FIG. 1.

FIG. 4 is an opposite end elevational view of the panelboard assembly.

FIG. 5 is a sectional view taken along the line 5—5 in FIG. 1.

FIG. 6 is a sectional view taken along the line 6—6 in FIG. 1.

FIG. 6a is a schematic view of one bus bar illustrating the bus bar form prior to assembly in a cabinet.

FIG. 8 is a sectional view taken along the line 8—8 in FIG. 7.

FIG. 9 is a top elevational view of the left side web shown in FIG. 7.

FIG. 10 is a top elevational view of the right side web shown in FIG. 7; and

FIG. 11 is a side elevational view of the web shown in FIG. 10.

DESCRIPTION OF THE PREFERRED EMBODIMENT

Figure 1A:
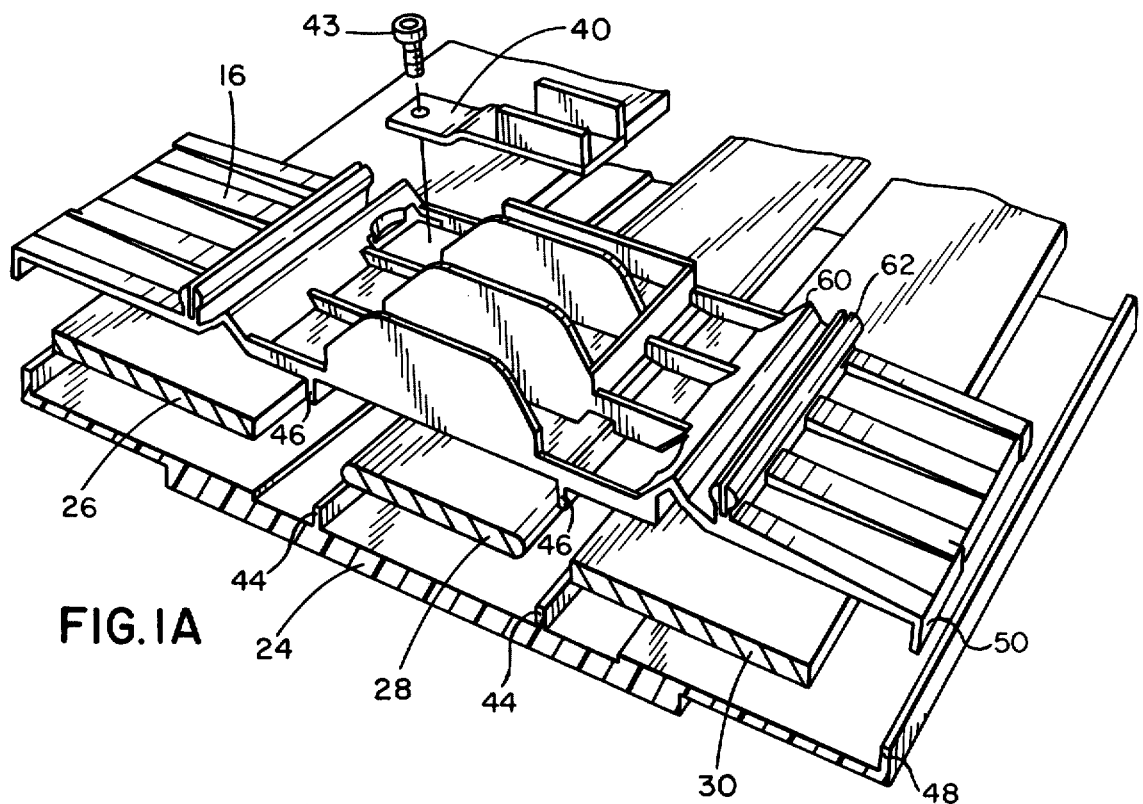
FIG. 1A is an exploded view showing a modular base of the invention together with a portion of three bus bars and a bottom insulating plate.

Referring now more specifically to the drawings, a panelboard assembly for use with 400 amp. 227/480 volt A.C. 3 phase 4 wire systems having maximum available fault currents not exceeding 14,000 RMS symmetrical amps or with 120/208 volt A.C. systems having maximum fault currents not exceeding 65,000 RMS symmetrical amps is indicated in FIGS. 1-3 by the reference character 10.

The panelboard assembly 10 is located in a cabinet (not shown) having a cover with a door as set forth in the aforementioned patent and an interior trim assembly 12 seen in FIG. 2 is interposed between the assembly 10 and the door. The door provides access to the handles of respective circuit breakers indicated by dashed references 14 and 15 in FIGS. 5 and 8 respectively. The breaker handles extend in a conventional manner through respective openings in the interior trim for access thereto and the circuit breakers are located between the hopper 12 and assembly 10.

The assembly 10 includes a plurality of modular bases 16 which is best shown in FIG. 1A, a main end base 18 and an end cap 20. As best seen in FIG. 1 assembly 10 utilizes a pair of elongated rails or members 22 which are conventionally secured in engagement with the metal back wall indicated by dashed lines 23 of the cabinet. The end base 18 and cap 20 together with modular bases 16 and a bottom insulating plate 24 are secured to and bridge the rails 22 to form a unitary assembly.

The modular bases 16, the end base 18, cap 20 and bottom plate 24 are each formed of a thermoplastic material such as Noryl, and the bases 16 each have ends for nested engagement with each other and for engagement with the end base 18 in a manner similar to that explained in the aforementioned patent. The end base and cap are in turn secured to the rails.

A plurality of spaced, parallel, elongate, generally flat bus bars 26, 28 and 30 best seen in FIG. 5 extend through respective passages in base 18 and are secured to the base 18 together with respective lugs 32 for receiving incoming power. The bars are provided with offsets adjacent one end of base 18 so that they each extend toward the cabinet back wall and then toward cap 20 at respective positions between the plate 24 and the modular bases 16. Respective partition walls on the base 18 as best seen in FIG. 2 separate the respective bus bars and the bars from a neutral assembly 36. The neutral assembly comprising spaced parallel bars having suitable lugs and screws is secured to base 18 along opposite longitudinal margins thereof and a bridging bar 38 extends between portions of the neutral assembly spaced above the upper surface of base 18.

As seen in FIG. 6A the bus bars such as 26 are provided with a bow or bend in the portion of the bar overlapped by bases 16. The bend introduces approximately ¼" difference between the bottom of the bow and the opposite bow ends. When the bars are clamped or secured in a cabinet adjacent the base 18 and cap 20 as indicated in FIG. 2, the bars are, of course, straightened. This creates a downward force on the thin insulator 24 forcing the intermediate portion against the cabinet back wall to ensure good heat transmission. It will be noted the insulator 24 is less than ⅛" thick, substantially 10" wide and can be a selected length between 17" and 32" approximately wherefore it is subject to easy flexure if not held fast.

Respective U-shaped bus stabs or branch connectors 40 and 42 are secured to the upper surface of respective bars 26, 28 and 30 at longitudinally spaced positions by means of studs 43 and 43a. The stabs connect the circuit breakers to respective bus bars. The bus stabs 40 and 42 are of a type described in U.S. Pat. No. 4,153,318 which issued May 8, 1979 arranged for receiving either a plug-on type or bolt-on type circuit breaker, the latter being of a type such as described in U.S. Pat. No. 4,144,554 issued Mar. 13, 1979.

It will be noted that the bus bars extend along the upper planar surface of insulating plate 24, which is less than 0.125" thick and in close heat transmitting relationship to the cabinet back wall. The bars are overlapped by modular insulators 16. The center bus bar 28 is also provided with a mylar wrap and a pair of upstanding legs 44 on plate 24 are each received between a pair of legs 46 depending from each base 16 to provide a surface path of high resistance between the bar 28 and each other bar. Similarly to provide a high resistance surface path against electrical leakage an upstanding leg 48 is provided along opposite margins of plate 24 and an aligned depending leg 50 is provided on each base 16 to nestingly receive a respective leg 48. The legs 48 and 50 are located between a respective one of bars 26 and 30 and an L-shaped bend 51 on each rail and overlapping the adjacent edge of each base 16.

The plate 24 has a bottom planar surface portion extending below the center bar 28 and partially across each side or outer bus bar to a step or recess in which the main leg of a respective rail 22 is received so that the bottom surface of the rail is flush with the surface of plate 24 for coplanar engagement with the cabinet back wall and to assist in heat transfer.

As mentioned each base 16 is coincident with and aligned with similar modular base 16 in overlapping engaged relationship with the bars 26, 28 and 30. Each base 16 is provided with spaced upstanding transverse partition walls 52 to define compartments spaced along the central longitudinal axis of the mounting pan assembly and a respective bus stab or branch connector 40 or 42 is located in each compartment. The partition walls assist in preventing inadvertent contact with the stabs or connectors and provide long surface paths to guard against electrical leakage between bus stabs.

The partitions and compartments are located above the center bus bar 28 and the compartments which receive stabs 40 comprise a planar wall supporting a respective stab 40 in overlapping insulating heat transmitting relationship to bar 28. The stabs 40 and 42 are U-shaped in cross section and locating lugs are provided in the compartments for engaging corresponding passages in the back leg of a respective bus stab to properly position each stab. The compartments receiving stabs 42 have access passages permitting stabs 42 to be secured directly to bar 28. Stabs 40 each have a tab 54 extending toward a respective bar 26 or 30, but since the upper surfaces of those bars are located below the upper plane of the central rib and are covered by modular base 16, a respective passage 56 is provided in each modular member on base 16 and the tab 54 is provided with an offset so as to be in coplanar alignment with the upper surface of the respective bars 26 and 30. Thus the tabs 54 each extend through a respective passage 56 in each base 16 and engage the upper surface of a respective bus bar 26 or 30 for securement to the bar by means of stud 43.

Adjacent tabs 54 extend from a respective passage 56 into a respective compartment from opposite side or outer bus bars 26 and 30. A barrier rib or wall 58 is formed along the edge of each compartment opposite the respective passage 56 to prevent entrance of a stab into any compartment from a bus bar adjacent the respective barrier wall as explained in the aforementioned Diersing application. This ensures that adjacent stabs cannot extend from the same bus bar into adjacent compartments and also forms a tortuous path increasing the surface distance to an adjacent bus bar to provide the equivalence of a 2" surface gap, and 1" airgap between the end of a respective stab and a bus bar of another phase.

It will also be noted that the modular insulators 16 each have an elongate aligned transverse integrally formed wall structure 60 located adjacent the outer margin of each passage 56. Each wall structure 60 also has a portion extending angularly toward a respective bus bar. An elongate resilient split bead 62 is formed along the outer margin of the wall structure 60 and just above a respective bus bar to receive a mounting recess in a circuit breaker housing indicated by dashed lines 14 or 15 as explained in the aforementioned Diersing application and related applications. A portion 64 of each insulator 16 extending from the bead 62 toward the outer margin of each bus bar and is provided with a generally planar surface overlappingly engaged with the respective bar to prevent the bar from being engaged by ionized gas and spaced ribs transverse to bead 62 to strengthen the bead and planar portion of insulator 16. The bus bar being located just below each bead or mounting rail provides support for the rail in response to engaging force of the breaker.

It will be appreciated that with a circuit breaker 14 extending from either of opposite beads 62 to engage one of the bus stabs 40 or 42, that the circuit breaker arc chute passage 66, located adjacent the end of the circuit breaker overlapping the bus stab, can face a bus bar 26 or 30 of a different phase then the bus bar to which the respective stab 40 or 42 is connected. In the event a single breaker connects to stab 42 its arc chute passage will of course face either of two bars 26 and 30 of different phase then the bar 28, while the arc chute passage of a breaker connected to a stab 40 can face a bar of another phase if the breaker is in overlapping position to a bus bar carrying the phase to which it is connected. Ionized gas exiting from the exit passage 66 may thus engage or contact a bar carrying current of different phase. The portions 64 of the modular insulators 16, however, overlaps the portion of the bar 26 or 30 positioned to be engaged by ionized gas exiting a circuit breaker. Contact by such ionized gas with a bar of different phase is therefore prevented. It will be noted that passages 56 are not accessible to the ionized gas of another phase as these passages will be either overlapped by a breaker carrying the same phase or be faced by a breaker connected to a stab carrying the same phase current.

Figure 7:
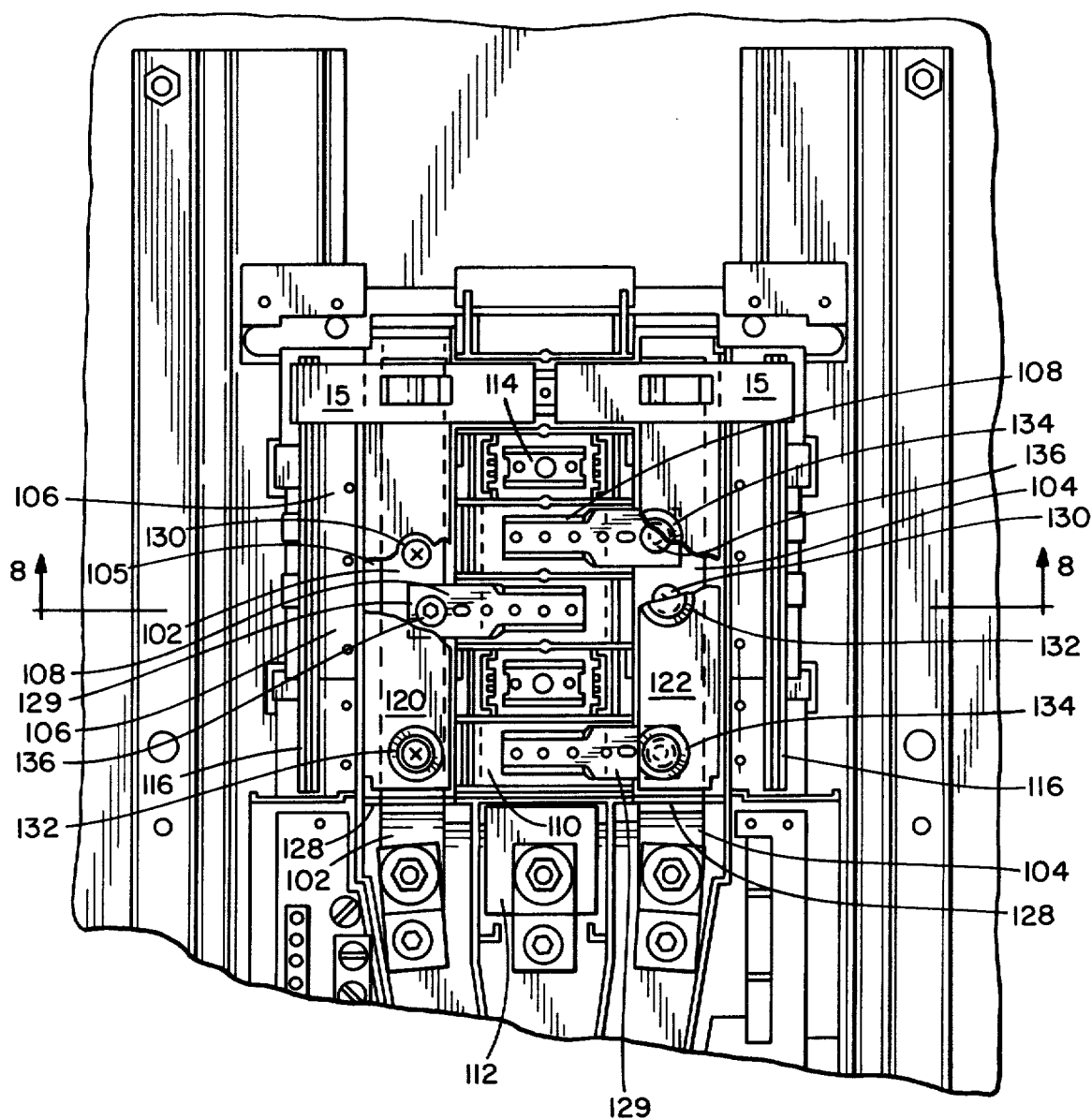
FIG. 7 is a fragmentary top elevational view of a panelboard assembly of the type shown in the aforementioned Diersing application and incorporating the principles of the present invention.

FIGS. 7 and 8 illustrate a portion of a mounting pan assembly of the type shown in the aforementioned Diersing application as modified in accordance with the present invention. In the embodiment shown in the aforementioned application side bus bars 102 and 104 extend from a base by means of a respective offset to planar walls 105 of one or more modular insulator bases 106. Bus stabs 108 connected to the upper surface of respective bars 102 and 104 project from the respective bar into a respective compartment formed along a central rib section 110. The central rib section 110 overlaps a central bus bar 112 to which bus stabs 114 were connected. In the described Diersing arrangement circuit breakers such as 15 illustrated in FIGS. 7 and 8 were mounted on respective beads 116 and on tripping in response to a fault condition, pass ionized gas through an exit passage indicated at 118. This gas may pass freely toward a bus bar of different phase in the event only a single circuit breaker is connected to the respective bus stab, as the exit passage or port 118 is then unblocked.

Figure 12:
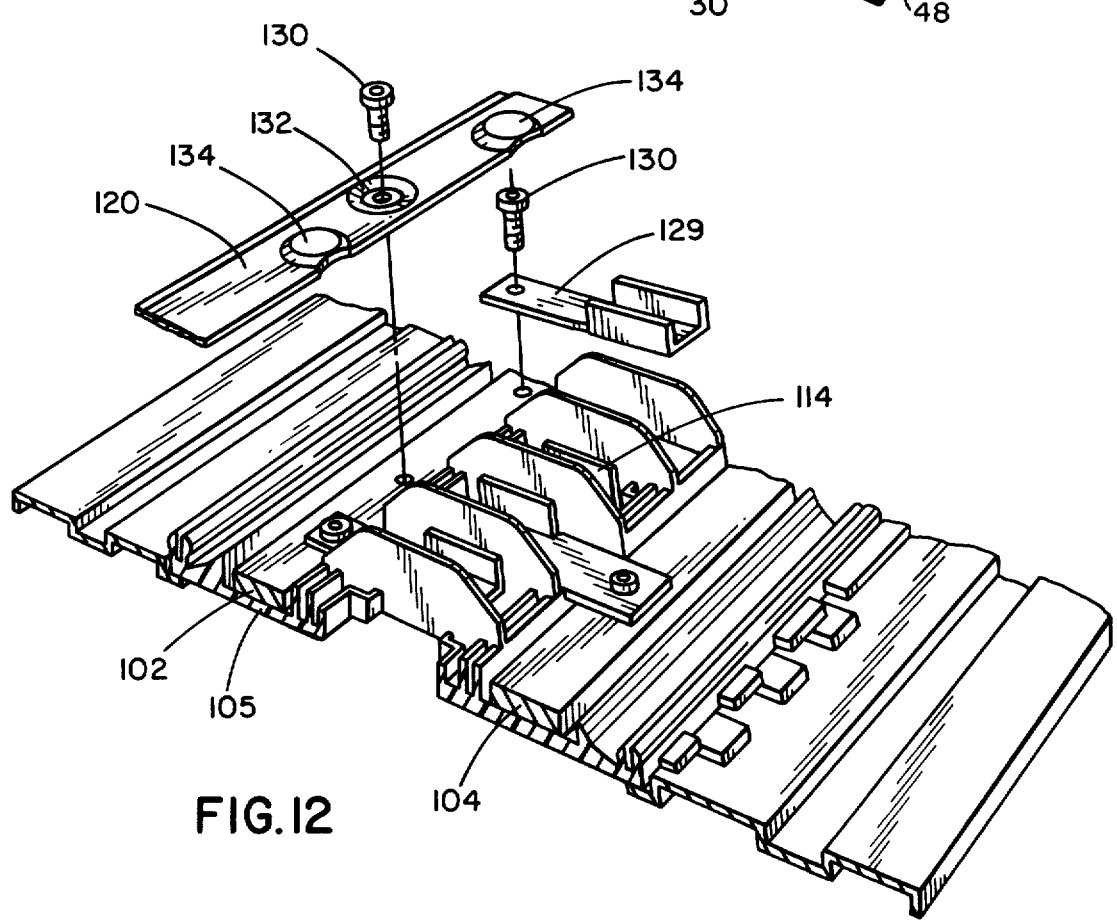
FIG. 12 is a fragmentary exploded view of the instant invention as shown in FIG. 7.

To solve this problem a pair of overlapping thin elongate insulating webs or strips 120 and 122 are provided. The webs are shown broken in FIGS. 7, 9, 10 and 11 and each is coincident with the width of respective surfaces 105 so as to fit tightly between the transverse margin wall structures 124 and 126 of the surfaces 105 and of similar length. In FIG. 12, a fragmentary exploded view is shown of the insulator base 106 together with bus bars 102 and 104 and a strip 120. In addition a phase barrier 128 is provided for the offset portion of bus bars 102 and 104.

The webs 120 and 122 lie generally in a plane coincident with the upper surfaces of the tabs 129 on stabs 108 as best seen in FIGS. 8 and 12 each web is secured by means of bolt or screw heads 130 to the insulators 106 and the respective bar 102 or 104. The heads 130 are located in offset or dished lower bosses 132 each having an aperture for registration with a respective screw or bolt. Thus each web is fastened to a respective bar and to the modular insulator and retained in the plane of the upper surface of the bus stab.

In addition each strip includes a second raised offset or dished boss 134 for each stab fastened to the respective bus bar and facing in the opposite direction to boss 132 for overlapping engagement with the upstanding head of screw 136 securing a respective bus stab to the respective bar. Thus each web prevents ionized gas exiting from a circuit breaker connected to a bus bar carrying current of a different phase from that overlapped by the web from engaging a stab or bar overlapped by the respective web.

The foregoing constitutes a description of an improved panelboard, interior assembly and an improved circuit breaker housing, whose inventive concepts are believed set forth in the accompanying claims.

We claim:

1. In a panelboard assembly including a center bus bar and an outer bus bar on each side and spaced from said center bus bar, each bus bar having one surface and an opposite other surface, and each electrically connected to a respective circuit breaker, each said breaker having an exit passage for transmitting ionized gas in response to the tripping of said breaker, each bus bar adapted to carry current of a different phase for transmission to a respective one of said circuit breakers, the improvement comprising:

a first insulating member in contiguous engagement with said one surface of each bus bar for insulating said bus bars from a cabinet back wall;

a second insulating member spaced from said first insulating member and supporting each circuit breaker with said exit passage facing toward a bus bar adapted to carry current of a phase different than the current transmitted to each said circuit breaker, said second insulating member including planar surface portions in coextensive overlapping engagement with said other surface of each bar and overlapped by each said circuit breaker with said planar portions located between each said circuit breaker exit passage and each bus bar to prevent said ionized gas exiting each said passage from engaging each said bus bar carrying current of a different phase in response to the tripping of each said circuit breaker;

a removable bus stab for each bus bar connected to said other surface of each respective bus bar and extending to a position intermediate said outer bus bars and connected to a respective circuit breaker, and an access passage in said second insulating member for each bus stab through which each respective bus stab is connected to its respective bus bar.

2. The assembly claimed in claim 1 in which said first insulating member has a planar surface engaged with each bus bar and is less than 0.125" thick and is adapted to engage a metal cabinet surface to provide heat transmission from each bus bar.

3. In the assembly claimed in claim 1, an integrally formed pair of upstanding legs on said first insulating member, one upstanding leg on each side of the intermediate bus bar extending transverse to each bus bar planar surface with each leg located adjacent opposite longitudinal margins of said intermediate bar; and a plurality of legs depending from said second insulating member with a pair of said depending legs in receiving engagement with each of said upstanding legs, said legs providing a high resistance surface path between bus bars and properly locating said first and second insulating members in position.

4. In the assembly claimed in claim 3, a pair of spaced metal rail members engaged with said first insulating member.

5. In the assembly claimed in claim 4 bend along one edge of each rail member extending into overlapping engagement with said second insulating member.

6. The assembly claimed in claim 1, in which said second insulating member includes an integrally formed resilient mounting bead overlapping one of said bus bars and supported by the overlapped bus bar.

7. In the assembly claimed in claim 2, a plurality of bus bars each having a bend formed therein intermediate the ends of each bar and engaged with said first insulating member for forcing said insulating member against a planar metal wall in response to the securing of each said bus bar adjacent opposite ends to said wall in a straight configuration.

8. A panelboard assembly as claimed in claim 6, wherein said second insulating member further includes a plurality of spaced, upstanding, transverse partition walls and a barrier wall forming compartments in which said removable bus stabs are located, each of said compartments having one of said access passages through which one of said bus stabs is connected to one of said bus bars.

9. A panelboard assembly as claimed in claim 8, wherein said second insulating member also includes an elongate, integrally formed wall extending parallel to said mounting bead, said wall located between said mounting rail and said access passages.

10. A panelboard assembly as claimed in claim 9, wherein said second insulating member further includes a plurality of integrally formed spaced ribs extending from said mounting bead in a direction away from said wall.

11. In a panelboard assembly including a pair of spaced apart outer bus bars, each bus bar having one surface and an opposite other surface, and each electrically connected to a respective circuit breaker, each said breaker having an exit passage for transmitting ionized gas in response to the tripping of said breaker, each bus bar adapted to carry current of a different phase for transmission to a respective one of said circuit breakers, the improvement comprising:

an insulator base in contiguous engagement with said one surface of each outer bus bar, said base including a projecting bead supporting each circuit breaker with said exit passage facing toward a bus bar adapted to carry current of a phase different than the current transmitted to each said circuit breaker;

a bus stab for each bus bar connected to said other surface of each respective bus bar and extending to a position intermediate said outer bus bars, a screw securing each bus stab to a respective bus bar;

a thin elongate insulating strip secured to the respective other surface of each outer bus bar and coextensive with said other surface, said strip having a plurality of upwardly embossed portions along one of its sides providing a plurality of raised edges along said one side, said upwardly embossed portions in overlapping engagement with the head of each screw securing said stabs to the respective outer bus bars and the stabs extending under said raised edges to a point intermediate said outer bus bars, said strip also having a plurality of downwardly embossed portions each having an opening therein;

fastening means extending through said openings in said downwardly embossed portions and securing said strip to said respective outer bus bars and to said insulator base.

* * * * *